(12) United States Patent
Cowan et al.

(10) Patent No.: US 12,097,969 B2
(45) Date of Patent: Sep. 24, 2024

(54) FUEL TANK FLAMMABILITY PROTECTION SYSTEM

(71) Applicant: The Boeing Company, Chicago, IL (US)

(72) Inventors: Daniel Cowan, North Charleston, SC (US); Shane Edward Arthur, Kirkland, WA (US); Marianne Elizabeth Wilkinson, Redmond, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 17/659,061

(22) Filed: Apr. 13, 2022

(65) Prior Publication Data

US 2023/0331394 A1 Oct. 19, 2023

(51) Int. Cl.
*B64D 37/32* (2006.01)

(52) U.S. Cl.
CPC .................................. *B64D 37/32* (2013.01)

(58) Field of Classification Search
CPC .............................. B64D 37/00; B64D 37/32
See application file for complete search history.

(56) References Cited

U.S. PATENT DOCUMENTS

| | | | | |
|---|---|---|---|---|
| 4,303,727 A | * | 12/1981 | Hamermesh | C08G 18/674 427/393 |
| 4,567,076 A | * | 1/1986 | Therrien | E04C 2/365 428/116 |
| 4,767,656 A | * | 8/1988 | Chee | E04B 1/941 428/116 |
| 6,948,567 B1 | * | 9/2005 | Cyphers | A62C 35/02 169/58 |
| 2010/0139933 A1 | * | 6/2010 | Guenthner | A62C 2/065 169/48 |
| 2011/0079403 A1 | * | 4/2011 | Lee | A62C 2/065 169/62 |
| 2011/0155741 A1 | * | 6/2011 | Tweet | B64D 37/32 220/560.02 |
| 2019/0031892 A1 | * | 1/2019 | Bender | C09D 5/00 |
| 2021/0172710 A1 | * | 6/2021 | Harris | F41H 5/24 |

FOREIGN PATENT DOCUMENTS

| | | | | |
|---|---|---|---|---|
| EP | 0687587 A1 | | 12/1995 | |
| GB | 1445832 A | * | 8/1976 | ............. C09K 21/14 |
| JP | 2011194952 A | | 10/2011 | |
| WO | 2007044077 A2 | | 4/2007 | |

OTHER PUBLICATIONS

Bisschoff, "Oxygenated Hydrocarbon Compounds as Flame Retardants for Polyester Fabric," Masters Thesis, University of Pretoria, Apr. 2000, pp. 46-52.

(Continued)

*Primary Examiner* — Justin M Benedik
(74) *Attorney, Agent, or Firm* — Yee & Associates, P.C.

(57) ABSTRACT

A fuel tank protection system having an outer wall for a fuel tank, an inner wall for the fuel tank, a gap between the inner wall and outer wall, and an intumescent material located within the gap between the inner wall and the outer wall.

22 Claims, 9 Drawing Sheets

(56) References Cited

OTHER PUBLICATIONS

Knazs et al., "Thermal Management Materials for EV Batteries," H.B. Fuller Presentation, May 11, 2021, 31 pages.
Wang et al., "Comparative Study of Fire Resistance and Char Formation of Intumescent Fire-Retardant Coatings Reinforced with Three Types of Shell Bio-Fillers," Polymers, vol. 13, No. 24, Paper 4333, 16 pages.
Extended European Search Report in EP23158448.3, mailed Sep. 4, 2023, 16 pages.
Li et al., "Insightful investigation of smoke suppression behavior and mechanism of polystyrene with ferrocene: An important role of intermediate smoke," Fire and Materials, Apr. 2018, vol. 42, No. 3, pp. 286-295.

* cited by examiner

FUEL TANK FLAMMABILITY PROTECTION SYSTEM

BACKGROUND INFORMATION

1. Field

The present disclosure relates generally to aircraft and in particular, to fuel tanks in aircraft. Still more particularly, the present disclosure relates to a flammability protection system for fuel tanks in an aircraft.

2. Background

The fuel capacity of an aircraft limits the range of the aircraft. Commercial aircraft have fuel tanks located in the wings and in the center between the wings in the fuselage. The range of an aircraft can be increased by adding additional fuel capacity to the aircraft. Fuel capacity can be increased by adding external and internal fuel tanks to the aircraft. These fuel tanks can be temporary or permanent fuel tanks.

SUMMARY

An embodiment of the present disclosure provides a fuel tank protection system comprising an outer wall for a fuel tank; an inner wall for the fuel tank; a gap between the inner wall and outer wall; and an intumescent material located within the gap between the inner wall and the outer wall and.

Another embodiment of the present disclosure provides a fuel tank system comprising a central fuel tank for an aircraft and an intumescent foam. The central fuel tank comprises an outer wall, an inner wall, and a gap between the inner wall and outer wall. The intumescent foam is located within the gap between the inner wall and the outer wall.

Yet another embodiment of the present closure provides a product manufacturing system comprising a control system that controls manufacturing equipment to fabricate a fuel tank having an outer wall, an inner wall, a gap between the inner wall and the outer wall, and an intumescent material located within the gap between the inner wall and the outer wall.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations as described below. For example, these considerations can include adding central fuel tanks to an aircraft to provide additional range. These types of fuel tanks can be added in the fuselage below the passenger areas in the cabin. These fuel tanks can also be located in the aft section of the aircraft. Adding central fuel tanks involves designing the fuel tanks to have increased safety. For example, central fuel tanks should have designs that that can reduce the occurrence of inconsistencies that can allow fuel to leave the fuel tank. Further, the design of the central fuel tanks should reduce internal heating and flammability. Further, the illustrative examples recognize and take into account that the design of these fuel tanks should be protected from undesired heat that may be applied from external sources. Further, these central fuel tanks should provide desired comfort for passengers. For example, the central fuel tanks should have a design that maintains passenger comfort. For example, the central fuel tank should be designed to insulate from cold temperatures of the fuel in the central fuel tank.

Thus, illustrative examples recognize and take into account that it would be beneficial to have a flammability protection system for a fuel tank. In these illustrative examples, the protection system for the fuel tank can employ flame retardant foam that will char if exposed to a sufficient amount of heat.

Figure 1:
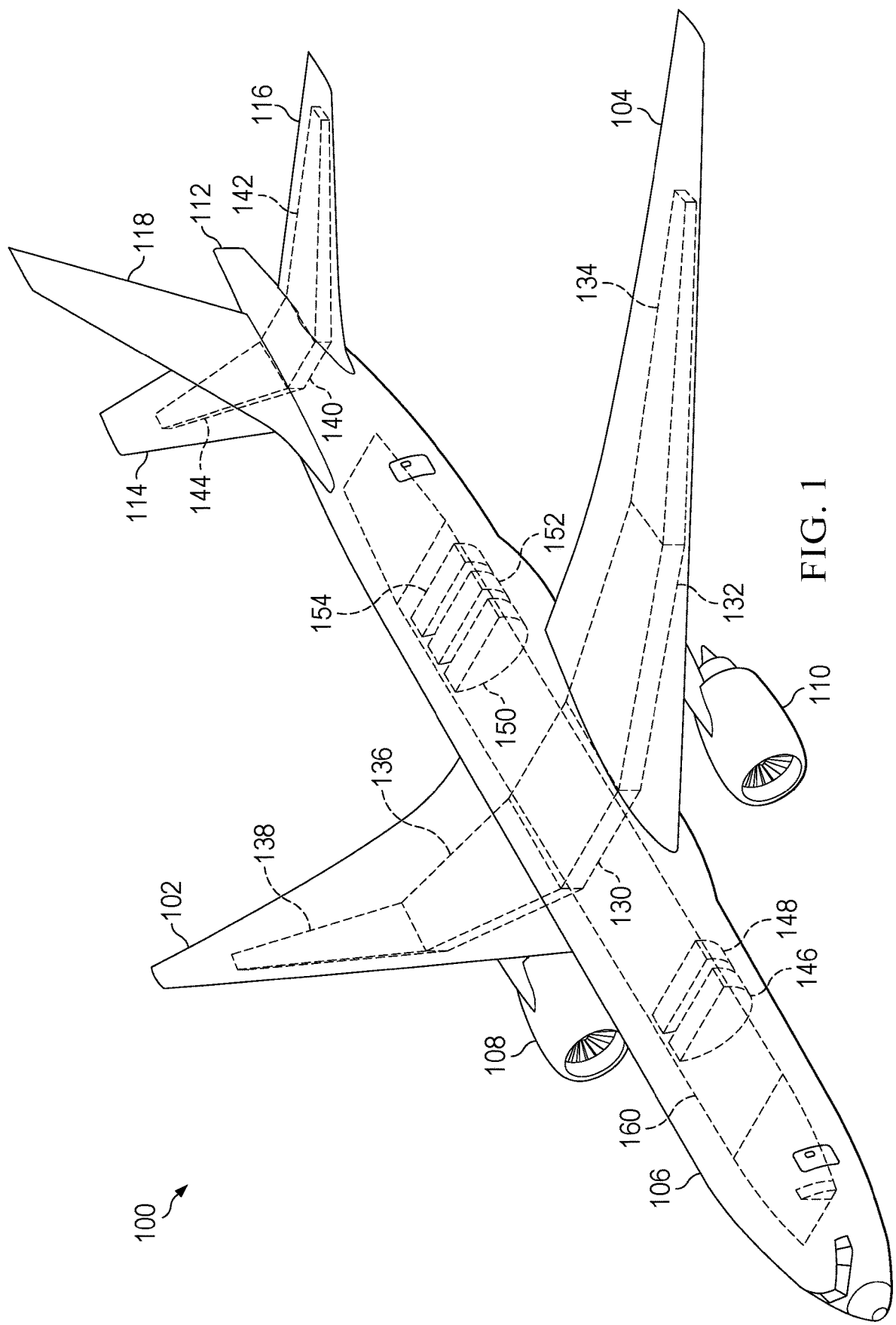
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106. Aircraft 100 also includes fuel tanks such as central tank 130, first left wing tank 132, second left wing tank 134, first right wing tank 136, second right wing tank 138, central tail tank 140, left tail tank 142, right tail tank 144, first central fuselage tank 146, second central fuselage tank 148, third central fuselage tank 150, fourth central fuselage tank 152, and fifth central fuselage tank 154.

As depicted the central fuselage fuel tanks are located in fuselage 106. Within fuselage 106, these central fuselage fuel tanks were located below passenger deck 160.

In these illustrative examples, one or more these fuel tanks in aircraft 100 can include a fuel tank protection system in accordance with an illustrative embodiment. The fuel tank protection system includes double walls in which an intumescent material is located between the double walls. The intumescent material can be in the form of a coating or a foam.

The use of a foam can increases passenger comfort. For example, this fuel tank protection system can insulate passengers seated in locations above a fuel tank from a cold temperature of the fuel in the fuel tank when the fuel tank is located below the passenger floor. As another example, the fuel tank protection system can reduce temperature of the fuel within the fuel tank that increases from internal heating that can be caused by surrounding equipment. Additionally, when sufficient heat is present, the intumescent material can form a product that does not facilitate combustion and can withstand temperatures generated from heat sources such as a flame.

Figure 2:
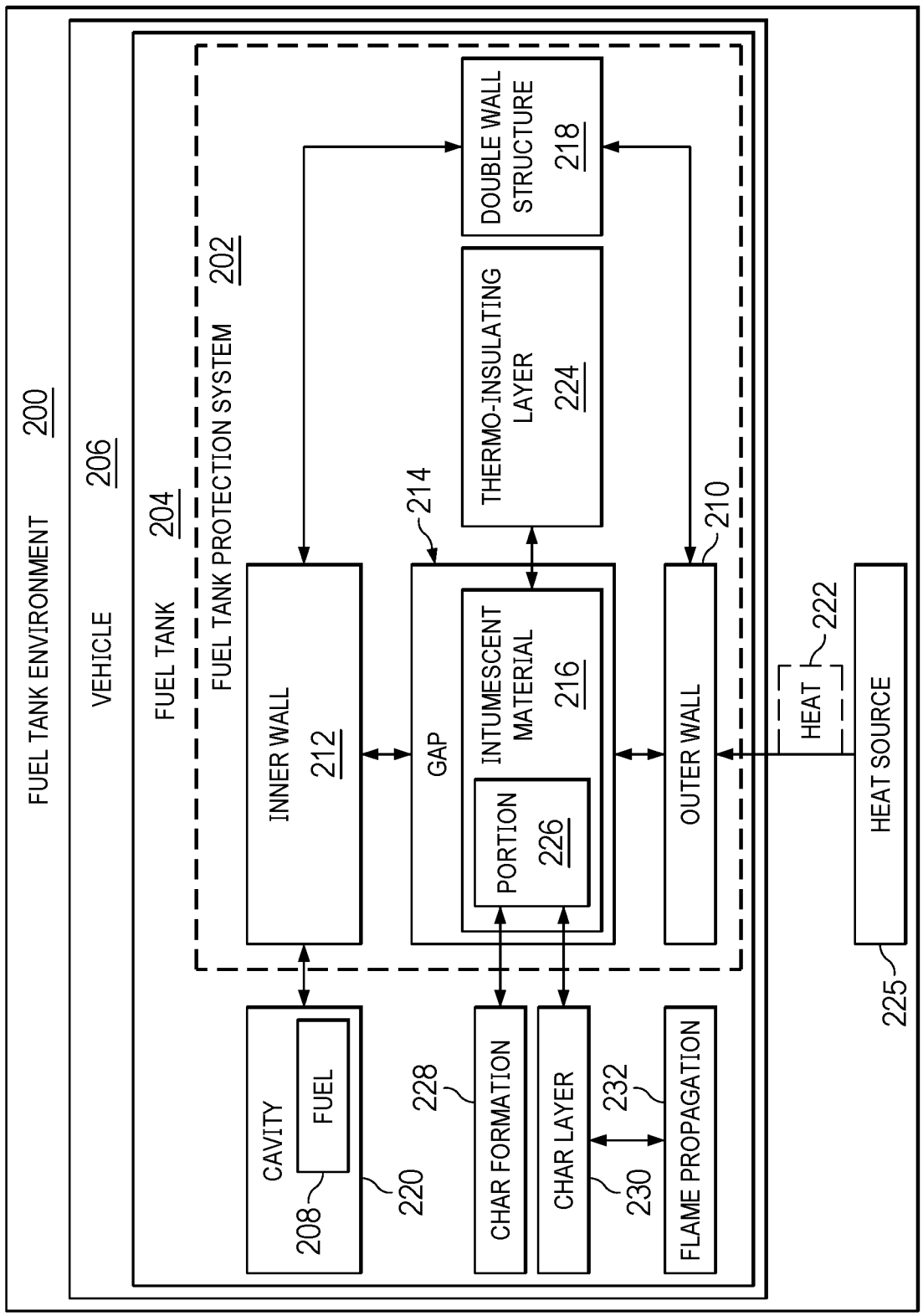
FIG. 2 is an illustration of a block diagram of a fuel tank environment is depicted in accordance with an illustrative embodiment.

With reference next to FIG. 2, an illustration of a block diagram of a fuel tank environment is depicted in accordance with an illustrative embodiment. In this illustrative example, fuel tank environment 200 is an environment in which fuel tank protection system 202 can be implemented for fuel tank 204.

As depicted, fuel tank 204 is located in vehicle 206. Vehicle 206 can also be one of a mobile platform, an aircraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, an automobile, and other suitable types of vehicles.

In this illustrative example, fuel tank protection system 202 comprises a number of different components. As depicted, fuel tank protection system 202 comprises outer wall 210 for fuel tank 204, inner wall 212 for fuel tank 204, gap 214, and intumescent material 216.

In this illustrative example, outer wall 210 and inner wall 212 form double wall structure 218 for fuel tank 204 in vehicle 206. Outer wall 210 and inner wall 212 can be formed various types of materials. For example, these walls can be comprised of a composite material, a metal, an alloy, aluminum, titanium, or some other suitable type of material. Each wall can be comprised of a different type of material from the other wall in double wall structure 218. Further, these walls can be separate components or can be part of another structure in vehicle 206. With this example, inner wall 212 defines cavity 220 for holding fuel 208.

In this illustrative example, gap 214 is located between inner wall 212 and outer wall 210. In this depicted example, intumescent material 216 is located within gap 214 between outer wall 210 and inner wall 212.

Intumescent material 216 can be applied any number different ways. For example, intumescent material 216 can be sprayed onto outer wall 210 or inner wall 212, brushed onto outer wall 210 or inner wall 212, or sprayed into gap 214. In another example, outer wall 210 or inner wall 212 can be dipped in intumescent material 216.

As depicted, fuel tank protection system 202 provides protection against combustion of fuel 208 carried in cavity 220 in fuel tank 204. Intumescent material 216 can be selected to function as an insulator to protect fuel 208 in fuel tank from heat 222. In functioning as an insulator, intumescent material 216 can also be selected to increase passenger comfort from colder temperatures that can result from the temperature of fuel 208.

Intumescent material 216 can act as thermo-insulating layer 224 to reduce changes in the temperature of fuel 208. The changes can be reducing increases in temperature from heat 222. In this illustrative example, heat 222 can be applied to outer wall 210 from heat source 225 outside of fuel tank 204. Heat source 225 can be an expected heat source such as equipment within vehicle 206. In other examples, heat source 225 can be an unexpected heat source.

This protection can take a number of different forms. For example, protection can be to provide insulation to temperatures of fuel 208 within fuel tank 204 or insulation to temperatures of the environment outside of fuel tank 204. In another illustrative example, the protection can take the form of impeding flame propagation into fuel tank 204.

For example, intumescent material 216 can be thermo-insulating layer 224 within gap 214. Further, portion 226 of intumescent material 216 can undergo char formation 228 in response to heat 222. Char formation 228 can occur when a sufficient amount of heat 222 is applied to intumescent material 216.

In the illustrative example, in undergoing char formation 228 in response to heat 222, portion 226 of intumescent material 216 can undergo a reaction that forms carbon-carbon structures. Carbon-carbon structures can be —C=CH$_2$ fragments at polymer chain ends that condense to form carbon-rich residues. In other words, the reaction forms a nonvolatile residue that is richer in carbon than before the reaction. Char formation 228 results in char layer 230, which is a poor conductor of heat.

In a foam state and with char formation 228, intumescent material 216 can encapsulate and seal against inconsistencies such as cracks or cultures. Further, char layer 230 can reduce or impede flame propagation 232. Further, the transfer of gases through char layer 230 can also be reduced or impeded. For example, intumescent material 216 in an expanded or a foam state can have a process that reduces or impedes the transfer of gases through intumescent material 216. Further, intumescent material 216 can have a thermal conductivity that is low enough to serve as a protective barrier to insulate against heat 222. In one illustrative example, char formation 228 reduces the rate of temperature increase below char layer 230.

Flame propagation 232 can be reduced through impeding or reducing a diffusion of oxygen by char layer 230. In other words, char layer 230 reduces or prevents oxygen from passing through char layer 230. As result, flame propagation 232 is reduced such that combustion does not occur past char layer 230 into inner wall 212 into cavity 220 of fuel tank 204.

This impedance of flame propagation 232 can be designed to occur such that the desired safety operations can be performed with respect to vehicle 206. The method impedance can depend on the configuration of intumescent material 216 within gap 214.

Figure 3:
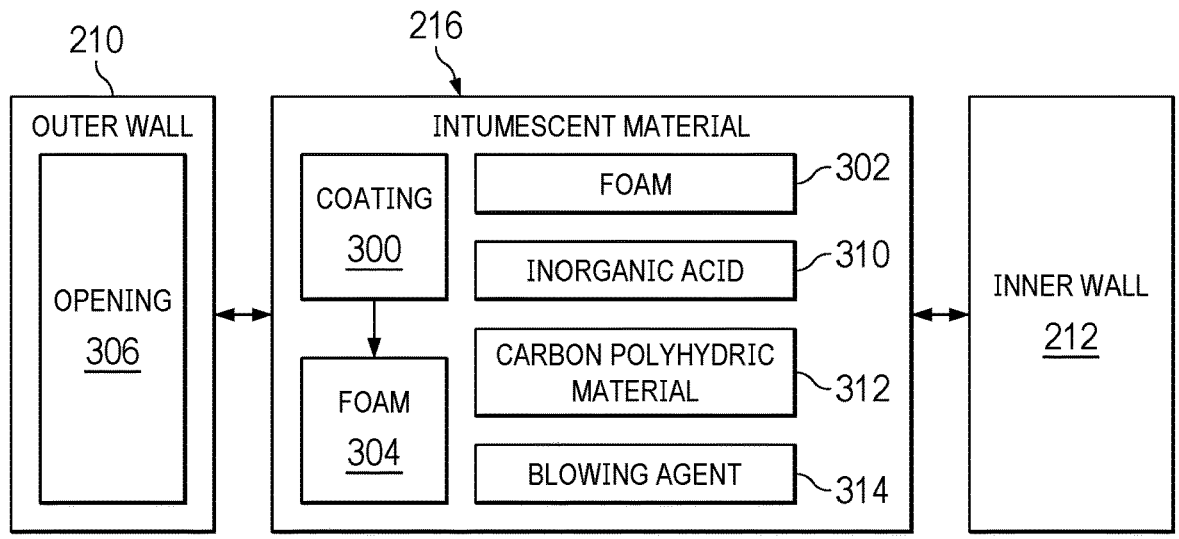
FIG. 3 is an illustration of a block diagram of an intumescent material in a gap in a double wall structure in a fuel tank in accordance with an illustrative embodiment.

With reference to FIG. 3, an illustration of a block diagram of an intumescent material in a gap in a double wall structure in a fuel tank is depicted in accordance with an illustrative embodiment. In the illustrative examples, the same reference numeral may be used in more than one figure. The reuse of a reference numeral in different figures represents the same element in the different figures.

In this illustrative example, intumescent material 216 can take a number of different forms within gap 214 between outer wall 210 and inner wall 212. For example, intumescent material 216 can take the form of at least one of coating 300 or foam 302. As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Intumescent material 216 can comprise an inorganic acid 310, carbon polyhydric material 312, and blowing agent 314. Inorganic acid 310 can be a catalyst for carbon polyhydric material 312 to react to form char layer 230 in response to a sufficient amount of heat 222. Blowing agent 314 can be used to cause intumescent material 216 to form foam 302. Blowing agent 314 can be a spumific that produces gas to cause intumescent material 216 to form foam 302.

In one illustrative example, carbon polyhydric material 312 can include halogenated compounds such as chlorinated paraffin. As another example, carbon polyhydric material 312 can be at least one of titanium dioxide (TiO2), or stannous oxide (SnO2), or combinations thereof.

In yet another illustrative example, intumescent material 216 can be coating 300 comprising at least one of aromatic polyisocyanate, an aromatic polycarboxylic compound, furfuryl alcohol, and combinations thereof. In yet, other examples, intumescent material 216 can comprise aromatic anhydrides, isocyanates, and combinations thereof. Thus, intumescent material 216 can be comprised of at least one of an aromatic polyisocyanate, an aromatic polycarboxylic compound, a furfuryl alcohol, an anhydride, an isocyanates, or other suitable materials.

As another example, intumescent material 216 can be, for example, flame retardant polyurethane foam such as EV Protect 4006 available from H.B. Fuller Company. EV Protect 4006 is a two-component material that is mixed to form a flame-retardant polyurethane foam.

In another illustrative example, intumescent material 216 can be selected as one that does not undergo char formation 228. Intumescent material 216 can be foam 302 or expand form foam 302 without needing to undergo char formation 228 to form char layer 230. For example, intumescent material 216 can include sodium silicate. Application of heat 222 results in water vapor expanding glass into foam 302. With this type of intumescent material, impeding flame propagation can occur without using char layer 230.

Different configurations of intumescent material 216 can be used to provide at least one of providing insulation or impeding flame propagation. In the illustrative example, coating 300 can be located on at least one of outer wall 210 or inner wall 212. For example, coating 300 can be located on outer wall 210, inner wall 212, or both. In another illustrative example, coating 300 can be located on outer wall 210 while foam 302 fills some or all of gap 214.

When coating 300 is present on at least one of outer wall 210 or inner wall 212, coating 300 can expand in response to heat 222 to form thermo-insulating layer 224 within gap 214. For example, coating 300 can expand to form foam 304 in response to heat 222.

Further, in another illustrative example, intumescent material 216 can expand into opening 306 formed in outer wall 210 of fuel tank 204 in response to unintended impact that forms opening 306 and heat 222 being applied to outer wall 210 of fuel tank 204. In this example, intumescent material 216 located in a location of at least one of in opening 306 or outside of opening 306 on an outer surface of outer wall 210 can char in response to heat 222 being applied to outer wall 210 of fuel tank 204.

Thus, the illustrative examples provide a double-walled fuel tank that includes an intumescent material in a gap between the inner and outer walls. This intumescent material can take the form of a foam or coating. The intumescent material can protect from undesired inconsistencies such as fractures or punctures. Further, the intumescent material in the gap provides an insulation layer that can protect against the fuel against internal heating from surrounding equipment and increased passenger discomfort.

In some illustrative examples, the intumescent material can char when exposed to a sufficient amount of heat. The charring forms a layer that does not support combustion and can withstand temperatures such a flame. The intumescent material can provide a barrier to combustion such that increase protections provided for fuel within a fuel tank.

Thus, increased range can be provided to aircraft or other vehicles in locations that may not be feasible without the fuel tank protection system described in the illustrative example. As result, additional fuel tanks can be included during manufacturing or as part of a reconfiguration or upgrade to an aircraft or other vehicle.

The illustration of fuel tank environment 200 in the different components in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, vehicle 206 can have one or more fuel tanks in addition to or in place of fuel tank 204. Fuel tank protection system 202 can be implemented in these additional tanks. Further, some fuel tanks may have a different configuration of intumescent material 216. For example, one fuel tank may use coating 300 while another fuel tank may use foam 302. In yet another tank, a combination of the two can be used. Further, in another illustrative example, fuel tank protection system 202 can include one or more additional walls in addition to outer wall 210 and inner wall 212. For example, an intermediate inner wall can be present such that gap 214 is present between the intermediate wall and outer wall 210. Another gap can be present between the intermediate wall and inner wall 212. Intumescent material 216 can also be present in the second gap.

Further, outer wall 210 can be comprised of multiple components or pieces. In this example, these different pieces can result in gap 214 having multiple segments. Each of these segments of gap 214 can be defined by inner wall 212 and another piece of outer wall 210 that is separate from other pieces of outer wall 210.

Figure 4:
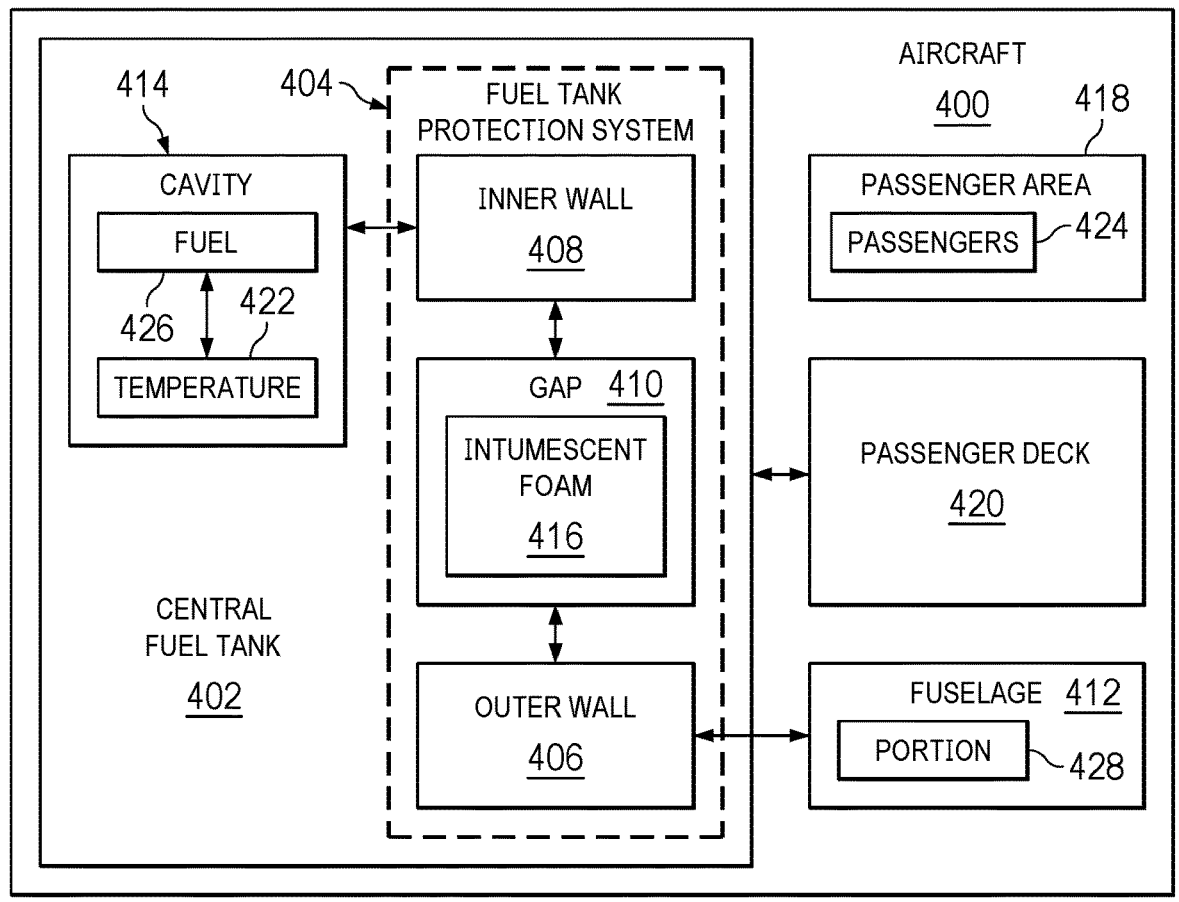
FIG. 4 is an illustration of a block diagram of a fuel tank for an aircraft in accordance with an illustrative embodiment.

With reference to FIG. 4, an illustration of a block diagram of a fuel tank for an aircraft is depicted in accordance with an illustrative embodiment. Aircraft 400 is an example of an implementation of vehicle 206. With this illustrative example, fuel tank 204 can be central fuel tank 402 in aircraft 400. In other illustrative examples, fuel tank 204 can be one of a lower fuselage tank, a wing tank, a tail tank, or some other suitable type of fuel tank 204 for aircraft 400.

In this illustrative example, fuel tank protection system 404 for central fuel tank 402 is an example of one manner in which fuel tank protection system 202 can be implemented. As depicted, fuel tank protection system 404 comprises outer wall 406, inner wall 408, gap 410, and intumescent foam 416. Gap 410 is located between outer wall 406 and inner wall 408, and intumescent foam 416 is located in gap 410. In one example, a portion of outer wall 406 can be part of fuselage 412 of aircraft 400 in some examples.

With this example, central fuel tank 402 can be located adjacent to passenger area 418 in fuselage 412 in aircraft 400. For example, central fuel tank 402 can be located below passenger deck 420 in passenger area 418. With this location, intumescent foam 416 can insulate passenger area 418 from temperature 422 of fuel 426 within central fuel tank 402. For example, fuel 426 can have temperature 422 that is much colder than passenger area 418. Without insulation from intumescent foam 416, passengers 424 within passenger area 418 may not have a desired level of comfort.

In another illustrative example, outer wall 406 does not have to entirely encompass inner wall 408. For example, outer wall 406 may only comprise portion 428 of fuselage 412 up a selected distance before passenger deck 420. With this example, gap 410 between inner wall 408 and outer wall 406 is not present. However, intumescent foam 416 can still be placed on inner wall 408 between inner wall 408 and passenger deck 420 to provide insulation from temperature 422. In other illustrative examples when insulation is desired for passenger 414, outer wall 406 extends all the way around inner wall 408 and can be comprised of a different structure material other than fuselage 412 for the area between inner wall 408 and passenger deck 420. In another illustrative example, outer wall 406 may be comprised of multiple sections such that gap 410 has multiple segments for central fuel tank 402.

In this illustrative example, inner wall 408 and outer wall 406 can be comprised of a composite material. With this example, inner wall 408 can have a first thickness of about 0.25 inches, outer wall 406 can have a second thickness of about 0.25 inches, and gap 410 can have a width of about 0.25 inches. In another example, inner wall 408 and outer wall 406 can be comprised of aluminum. In this example, inner wall 408 can have a first thickness of about 0.63 inches, outer wall 406 can have a second thickness of about 0.25 inches, and gap 410 can have a width of about 0.25 inches. These dimensions are provided as examples are not meant to limit dimensions used in other illustrative examples. The particular dimensions selected for the walls can depend on the particular material and size of the fuel tank.

Figure 5:
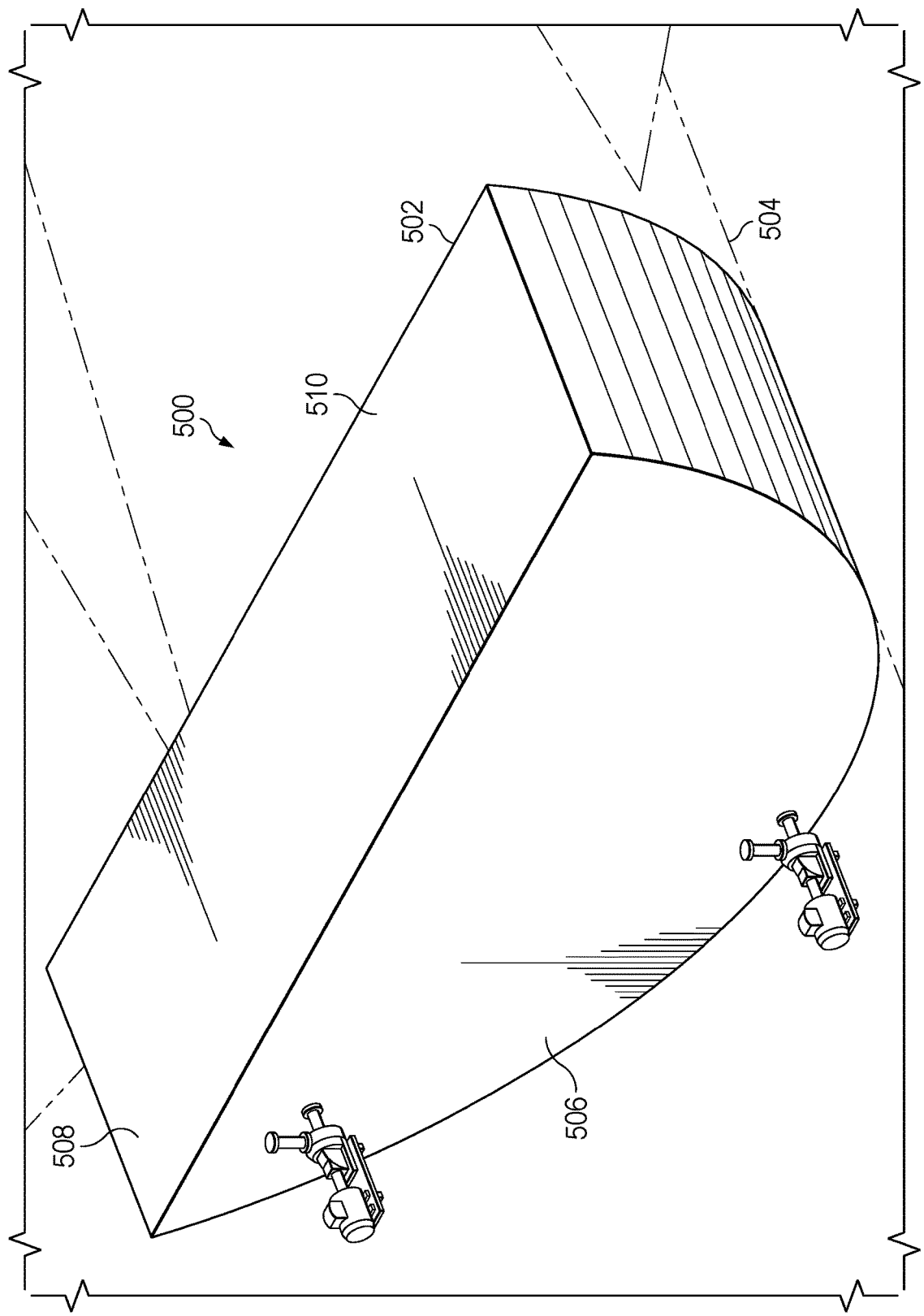
FIG. 5 is an illustration of a central fuel tank in an aircraft is depicted in accordance with an illustrative embodiment

With reference to FIG. 5, an illustration of a central fuel tank in an aircraft is depicted in accordance with an illustrative embodiment. As depicted central fuel tank 500 is an example of fuel tank 204 shown in block form in FIG. 2. Further, central fuel tank 500 can be an example of first central fuselage tank 146, second central fuselage tank 148, third central fuselage tank 150, fourth central fuselage tank 152, and fifth central fuselage tank 154 in FIG. 1. In this illustrative example, a fuel tank protection system can be implemented in central fuel tank 500.

In this perspective view of central fuel tank 500, outer wall 502 is fuselage 504. In this depicted example, outer wall 502 also includes section 506, which is not part of fuselage 504. Section 506 can be comprised of materials such as a composite, a metal, or alloy. In this example, section 506 can be comprised of aluminum.

In this depicted example, inner wall 508 is shown as top 510 of central fuel tank 500. In some illustrative examples, another section can be present for outer wall 502 that covers top 510 in central fuel tank 500 such that inner wall 508 is not shown. This section can be used when insulation or increased safety is desired for a passenger area above central fuel tank 500.

Figure 6:
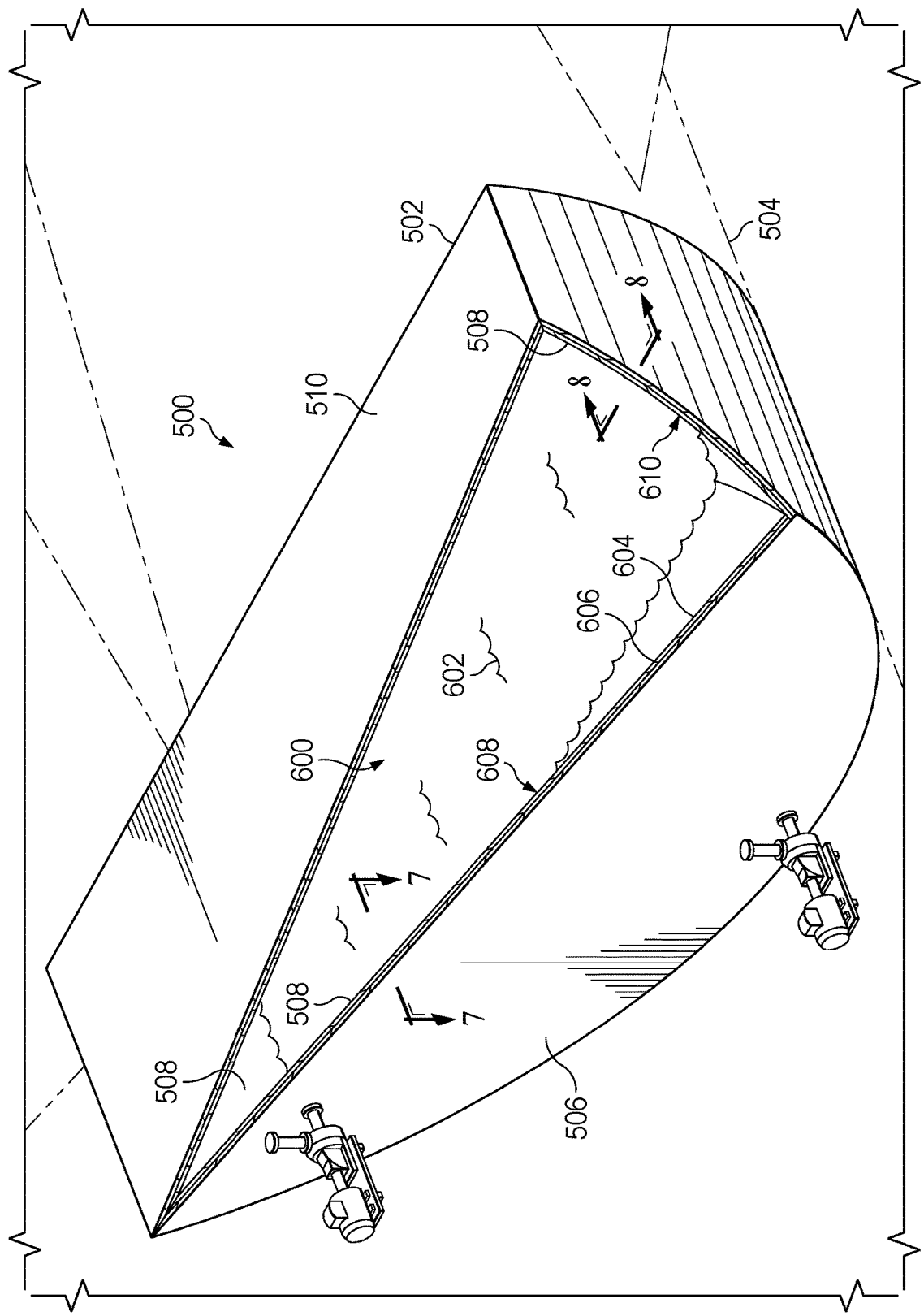
FIG. 6 is an illustration of an exposed view of a central fuel tank in accordance with an illustrative embodiment.

Turning next to FIG. 6, an illustration of an exposed view of a central fuel tank is depicted in accordance with an illustrative embodiment. In this figure, an exposed view of central fuel tank 500 is shown. As depicted, cavity 600 within central fuel tank 500 is defined by inner wall 508. Fuel 602 is held within cavity 600.

In this exposed view, a double wall structure 604 can be seen in central fuel tank 500 as formed by inner wall 508 and outer wall 502. In this illustrative example, gap 606 is present in double wall structure 604 between outer wall 502 and inner wall 508. As depicted, gap can have multiple segments such as segment 608 located between section 506 of outer wall 502 and inner wall 508. Segment 610 is located between inner wall 508 and fuselage 504 forming outer wall 502. In this example, the segments are noncontiguous. In other illustrative examples, a single segment or section is present when gap 606 is continuous within double wall structure 604.

Figure 7:
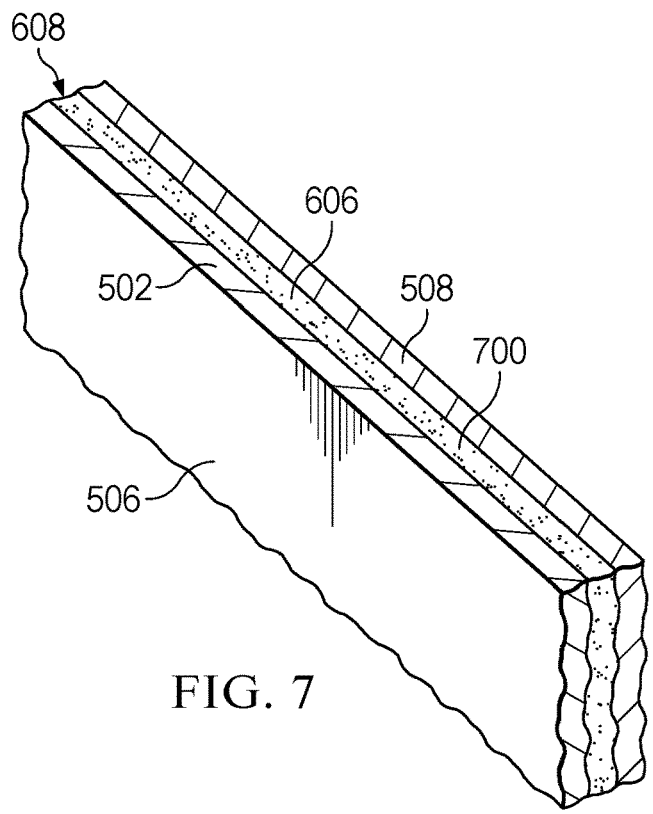
FIG. 7 is an illustration of a more detailed view of a double wall structure in accordance with an illustrative embodiment.

Next in FIG. 7, an illustration of a more detailed view of a double wall structure is depicted in accordance with an illustrative embodiment. In this figure, double wall structure 604 is seen in a direction of lines 7-7 in FIG. 6.

As depicted in this more detailed view, intumescent foam 700 is located in segment 608 of gap 606. In this example, intumescent foam 700 entirely fills gap 606. In other illustrative examples, intumescent foam 700 can be applied to at least one of outer wall 502 or inner wall 508 such that intumescent foam 700 does not completely fill gap 606.

Figure 8:
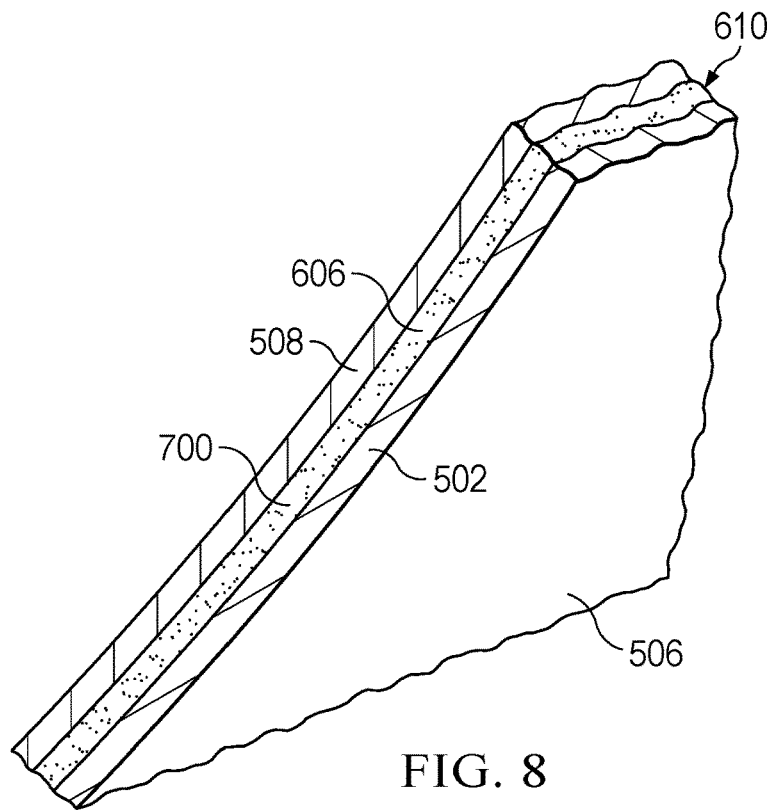
FIG. 8 is an illustration of another more detailed view of a double wall structure in accordance with an illustrative embodiment.

With reference to FIG. 8, an illustration of another more detailed view of a double wall structure is depicted in accordance with an illustrative embodiment. In this figure, double wall structure 604 is seen in a direction of lines 8-8 in FIG. 6. In this more detailed view, segment 610 of gap 606 can be seen between outer wall 502 and inner wall 508. As depicted, outer wall 502 is formed by fuselage 504. Intumescent foam 700 also fills segment 610 of gap 606 in this depicted example.

The use of double wall structure 604 with intumescent foam 700 is an example of an implementation of a fuel tank protection system for central fuel tank 500 and is an example of one implementation for fuel tank protection system 202 shown in block form in FIG. 2. The illustration of central fuel tank 500 and the configurations of outer wall 502 and inner wall 508 with intumescent foam 700 in gap 606 is provided as an example of one implementation of fuel tank protection system 202 for fuel tank 204 in FIG. 2. This illustration is not meant to limit the manner in which other illustrative examples can be implemented. For example, in other illustrative examples, the intumescent material can take the form of a coating applied to one or more of the walls in double wall structure 604 instead of intumescent foam 700.

In yet another illustrative example, central fuel tank 500 can have other shapes and can be implemented without using fuselage 504 to form part of outer wall 502. In yet other illustrative examples, outer wall 502 can also extend over top 510 such that 606 extends over top 510 enabling placement of intumescent foam 700 to provide additional insulation for passenger comfort.

In this example, intumescent foam 700 can provide an insulation feature such that passengers in a passenger area over central fuel tank 500 have increase insulation from temperatures of fuel 602 in central fuel tank 500. For example, when the temperature of fuel 602 is much colder than the passenger area, the use of intumescent from 700 can insulate the passenger area from this colder temperature. Further, intumescent foam 700 can also provide an insulation feature to insulate fuel 602 in cavity 600 from a heat source. For example, fuel 602 can be insulated from heat that may be generated by systems in an aircraft such as an auxiliary power unit (APU), environmental systems, or other equipment in the aircraft. In another example, fuel 602 can be insulated from cold from the environment outside of the aircraft. As a result, maintaining a desired temperature for fuel 602 may be made less difficult in the different illustrative examples.

Figure 9:
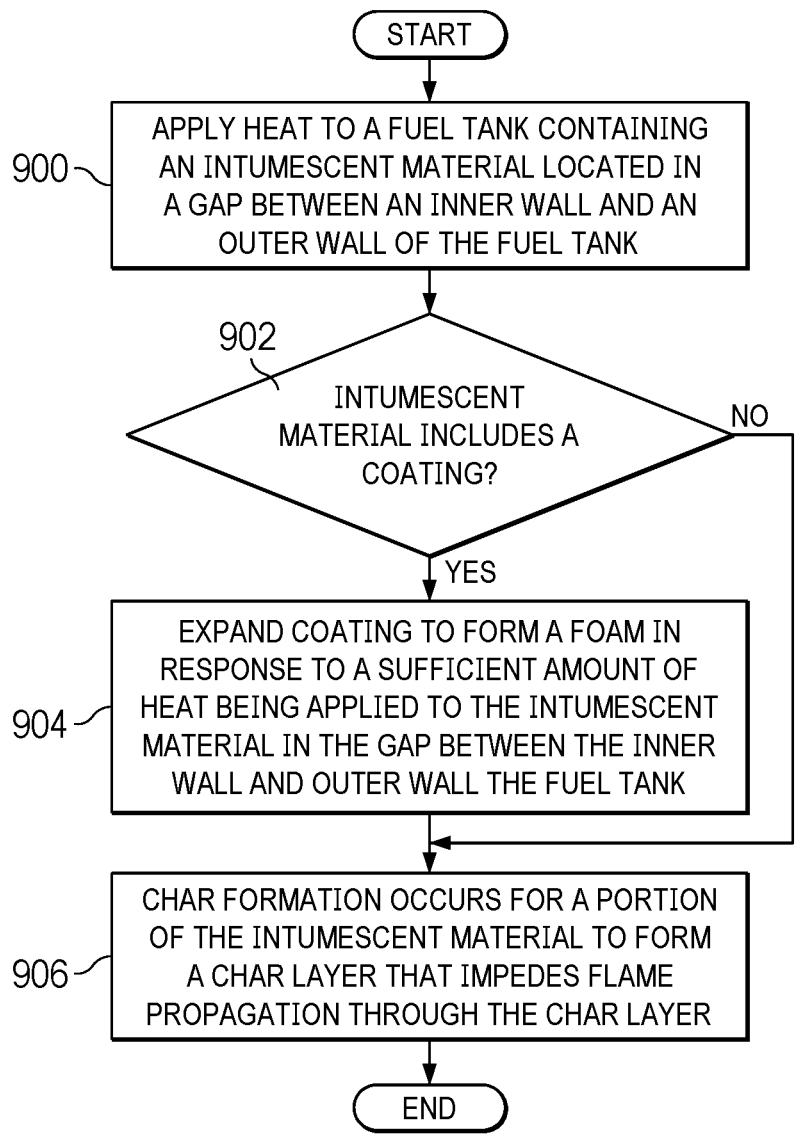
FIG. 9 is an illustration of a flowchart of a process for fuel tank protection in accordance with an illustrative embodiment.

Turning next to FIG. 9, an illustration of a flowchart of a process for fuel tank protection is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in fuel tank 204 using fuel tank protection system 202 in FIG. 2.

The process begins by applying heat to a fuel tank containing an intumescent material located in a gap between an inner wall and an outer wall of the fuel tank (operation 900). A determination is made as to whether the intumescent material includes a coating (operation 902).

If intumescent material includes a coating, the coating expands to form a foam in response to a sufficient amount of heat being applied to the intumescent material in the gap between the inner wall and outer wall the fuel tank (operation 904). A portion of the intumescent material undergoes char formation to form a char layer that impedes flame propagation through the char layer (operation 906). The process terminates thereafter.

With reference again to operation 902, if intumescent material does not include a coating, intumescent material can be in a form of a foam and the process proceeds to operation 906 as described above. In this example, intumescent material can include both a coating and a foam in which the coating can expand to form additional foam when sufficient heat is applied to the intumescent material.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, operation 906 can be an optional operation in some implementations where the intumescent material does not char. The foam in these examples can have characteristics that retard flame propagation.

Figure 10:
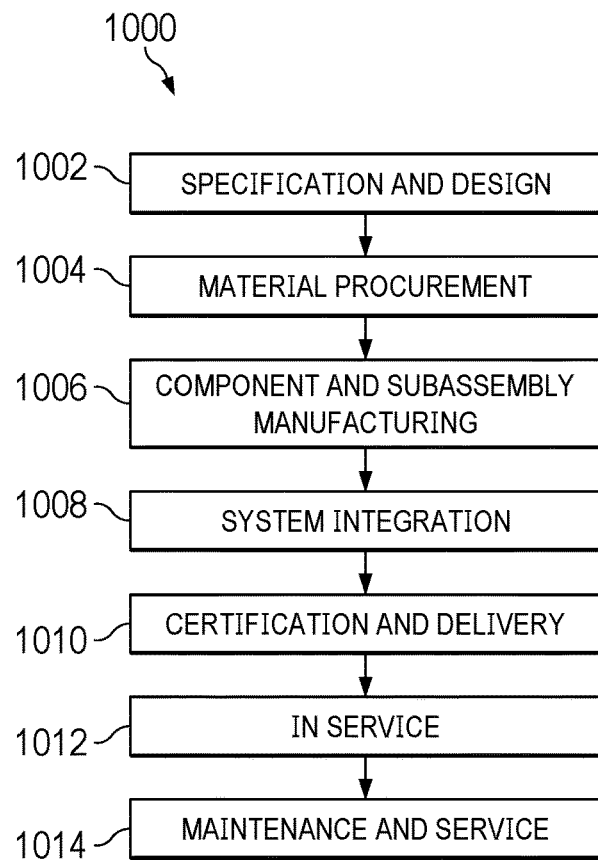
FIG. 10 is an illustration of an aircraft manufacturing and service method in accordance with an illustrative embodiment.
Figure 11:
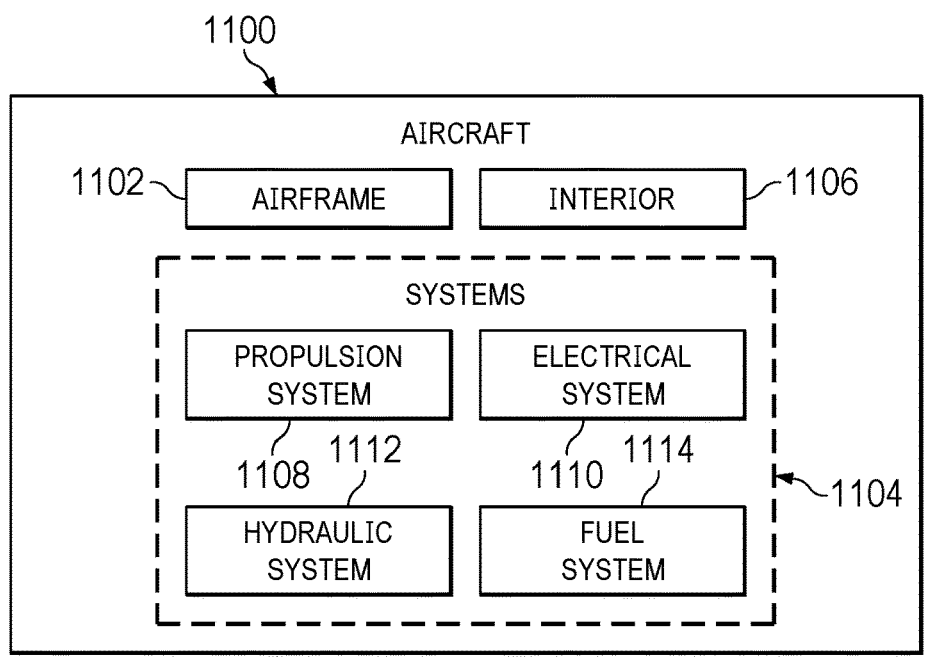
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During preproduction, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 can go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and fuel system 1114. Any number of other systems may be included. Although an aerospace example is shown, different illustrative embodiments may be applied to other industries, such as the automotive industry. In this illustrative example, fuel tank protection system 202 in FIG. 2 can be implemented in fuel system 1114 for aircraft 1100. The use of fuel tank protection system 202 in fuel system 1114 can increase operating aircraft 1100 safely. Further, fuel tank protection system 202 can provide insulation features that increase the comfort of passengers in aircraft 1100.

Apparatuses and methods embodied herein may be employed during at least one of the stages of aircraft manufacturing and service method 1000 in FIG. 10.

In one illustrative example, components or subassemblies produced in component and subassembly manufacturing 1006 in FIG. 10 can be fabricated or manufactured in a manner similar to components or subassemblies produced while aircraft 1100 is in service 1012 in FIG. 10. As yet another example, one or more apparatus embodiments, method embodiments, or a combination thereof can be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, increase the safety of aircraft 1100, or some combination thereof.

Fuel tank protection system 202 can be implemented during at least one of component and subassembly manufacturing 1006 or maintenance and service 1014. Insulation and protection properties of fuel tank protection system 202 can be used during in service 1012. For example, fuel tank protection system 202 can be implemented in fuel tanks installed during at least one of component and subassembly manufacturing 1006 or maintenance and service 1014. For example, fuel tanks can be upgraded or added during modification, reconfiguration, refurbishment, and other maintenance or service occurring in maintenance and service 1014.

Figure 12:
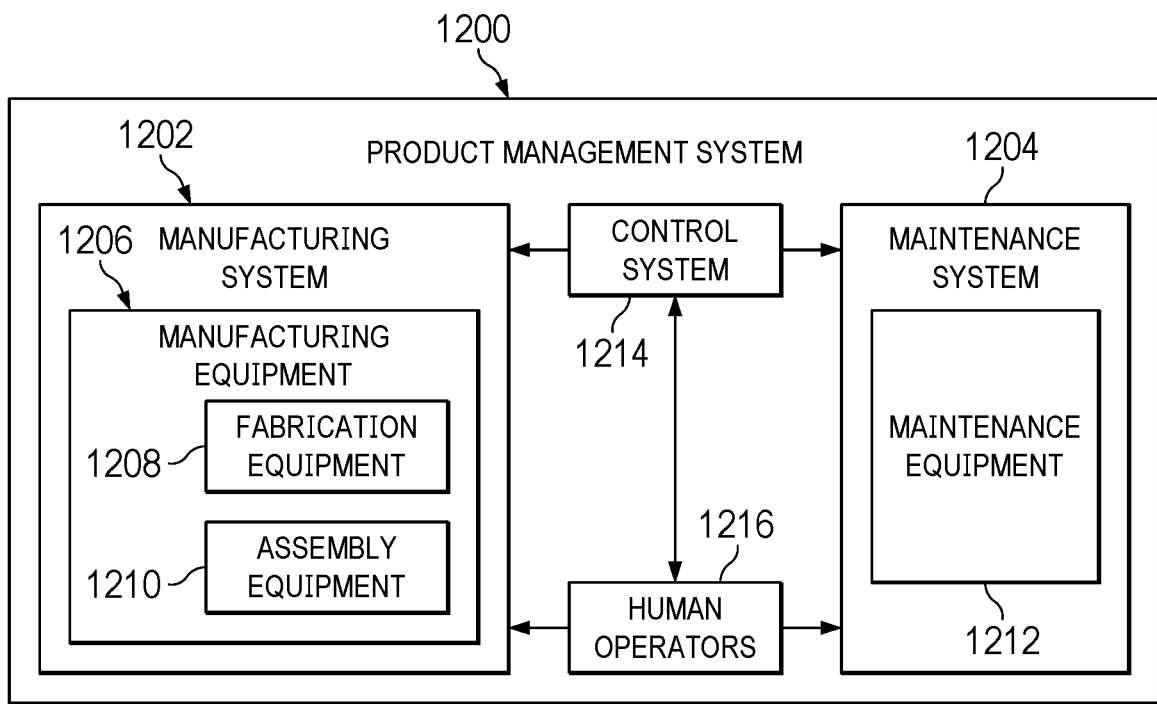
FIG. 12 is an illustration of a block diagram of a product management system is depicted in accordance with an illustrative embodiment.

Turning now to FIG. 12, an illustration of a block diagram of a product management system is depicted in accordance with an illustrative embodiment. Product management system 1200 is a physical hardware system. In this illustrative example, product management system 1200 includes at least one of manufacturing system 1202 or maintenance system 1204.

Manufacturing system 1202 is configured to manufacture products, such as aircraft 1100 in FIG. 11. As depicted, manufacturing system 1202 includes manufacturing equipment 1206. Manufacturing equipment 1206 includes at least one of fabrication equipment 1208 or assembly equipment 1210.

Fabrication equipment 1208 is equipment that used to fabricate components for parts used to form aircraft 1100 in FIG. 11. For example, fabrication equipment 1208 can include machines and tools. These machines and tools can be at least one of a drill, a hydraulic press, a furnace, an autoclave, a mold, a composite tape laying machine, an automated fibre placement (AFP) machine, a vacuum system, a robotic pick and place system, a flatbed cutting machine, a laser cutter, a computer numerical control (CNC) cutting machine, a lathe, or other suitable types of equipment. Fabrication equipment 1208 can be used to fabricate at least one of metal parts, composite parts, semiconductors, circuits, fasteners, ribs, skin panels, spars, antennas, or other suitable types of parts.

Assembly equipment 1210 is equipment used to assemble parts to form aircraft 1100 in FIG. 11. In particular, assembly equipment 1210 is used to assemble components and parts to form aircraft 1100 in FIG. 11. Assembly equipment 1210 also can include machines and tools. These machines and tools may be at least one of a robotic arm, a crawler, a faster installation system, a rail-based drilling system, or a robot. Assembly equipment 1210 can be used to assemble parts such as seats, horizontal stabilizers, wings, engines, engine housings, landing gear systems, and other parts for aircraft 1100 in FIG. 11.

In this illustrative example, maintenance system 1204 includes maintenance equipment 1212. Maintenance equipment 1212 can include any equipment needed to perform maintenance on aircraft 1100 in FIG. 11. Maintenance equipment 1212 may include tools for performing different operations on parts on aircraft 1100 in FIG. 11. These operations can include at least one of disassembling parts, refurbishing parts, inspecting parts, reworking parts, manufacturing replacement parts, or other operations for performing maintenance on aircraft 1100 in FIG. 11. These operations can be for routine maintenance, inspections, upgrades, refurbishment, or other types of maintenance operations.

In the illustrative example, maintenance equipment 1212 may include ultrasonic inspection devices, x-ray imaging systems, vision systems, drills, crawlers, and other suitable devices. In some cases, maintenance equipment 1212 can include fabrication equipment 1208, assembly equipment 1210, or both to produce and assemble parts that needed for maintenance.

Product management system 1200 also includes control system 1214. Control system 1214 is a hardware system and may also include software or other types of components. Control system 1214 is configured to control the operation of at least one of manufacturing system 1202 or maintenance system 1204. In particular, control system 1214 can control the operation of at least one of fabrication equipment 1208, assembly equipment 1210, or maintenance equipment 1212.

The hardware in control system 1214 can be implemented using hardware that may include computers, circuits, networks, and other types of equipment. The control may take the form of direct control of manufacturing equipment 1206. For example, robots, computer-controlled machines, and other equipment can be controlled by control system 1214. In other illustrative examples, control system 1214 can manage operations performed by human operators 1216 in manufacturing or performing maintenance on aircraft 1100. For example, control system 1214 can assign tasks, provide instructions, display models, or perform other operations to manage operations performed by human operators 1216. In these illustrative examples, control system 1214 to manage at least one of the manufacturing or maintenance of aircraft 1100 in FIG. 11 to employ a fuel tank protection system within fuel tanks for aircraft 1100. The fuel protection system can be implemented in fuel tanks during manufacturing fuel tanks for adding fuel tanks during maintenance to aircraft 1100.

In the different illustrative examples, human operators 1216 can operate or interact with at least one of manufacturing equipment 1206, maintenance equipment 1212, or control system 1214. This interaction can occur to manufacture aircraft 1100 in FIG. 11.

Of course, product management system 1200 may be configured to manage other products other than aircraft 1100 in FIG. 11. Although product management system 1200 has been described with respect to manufacturing in the aerospace industry, product management system 1200 can be configured to manage products for other industries. For example, product management system 1200 can be configured to manufacture products for the automotive industry as well as any other suitable industries.

Some features of the illustrative examples are described in the following clauses. These clauses are examples of features not intended to limit other illustrative examples.

Clause 1

A fuel tank protection system comprising:
an outer wall for a fuel tank;
an inner wall for the fuel tank;
a gap between the inner wall and the outer wall; and
an intumescent material located within the gap between the inner wall and the outer wall.

Clause 2

The fuel tank protection system according to clause 1, wherein a portion of the intumescent material undergoes a char formation in response to a heat.

Clause 3

The fuel tank protection system according to one of clauses 1 or 2, wherein in undergoing the char formation in response to the heat, the portion of the intumescent material undergoes a reaction that forms —C=CH$_2$ fragments at polymer chain ends that condense to form a nonvolatile residue that is richer in carbon than before the reaction.

Clause 4

The fuel tank protection system according to clause 2, wherein the char formation results in a char layer that reduces a diffusion of oxygen to impede a flame propagation.

Clause 5

The fuel tank protection system according to one of clauses 1, 2, 3, or 4, wherein the intumescent material comprises a coating located on at least one of the outer wall of the fuel tank or the inner wall of the fuel tank.

Clause 6

The fuel tank protection system according to one of clauses 1, 2, 3, 4, or 5, wherein the intumescent material is in a form of a foam.

Clause 7

The fuel tank protection system according to one of clauses 1, 2, 3, 4, 5, or 6, wherein the intumescent material expands to form a thermo-insulating layer within the gap in response to a heat.

Clause 8

The fuel tank protection system according to clause 7, wherein the intumescent material is in a form of a coating, wherein the coating expands to form a foam in response to the heat.

Clause 9

The fuel tank protection system according to one of clauses 1, 2, 3, 4, 5, 6, 7, or 8, wherein the intumescent material expands into an opening formed in the outer wall of the fuel tank in response to an impact generating the opening and a heat applied to the outer wall of the fuel tank.

Clause 10

The fuel tank protection system according to clause 9, wherein the intumescent material in the opening chars in response to the heat applied to the outer wall of the fuel tank.

Clause 11

The fuel tank protection system according to one of clauses 1, 2, 3, 4, 5, 6, 7, 8, 9, or 10, wherein the outer wall is a fuselage of an aircraft and the inner wall forms a cavity for holding fuel.

Clause 12

The fuel tank protection system according to one of clauses 1, 2, 3, 4, 5, 6, 7, 8, 9, 10, or 11, wherein the fuel tank is located adjacent to a passenger area and wherein the inner wall and the intumescent material insulate the passenger area from a temperature within the fuel tank.

Clause 13

The fuel tank protection system according to one of clauses 1, 2, 3, 4, 5, 6, 7, 8, 9, 10, 11, or 12, wherein the inner wall and the outer wall are comprised of a composite material and wherein the inner wall has a first thickness of about 0.25 inches, the outer wall has a second thickness of about 0.25 inches, and the gap has a width of about 0.25 inches.

Clause 14

The fuel tank protection system according to one of clauses 1, 2, 3, 4, 5, 6, 7, 8, 9, 10, 11, 12, or 13, wherein the inner wall and the outer wall are comprised of aluminum and wherein the inner wall has a first thickness of about 0.63 inches, the outer wall has a second thickness of about 0.25 inches, and the gap has a width of about 0.25 inches.

Clause 15

The fuel tank protection system according to one of clauses 1, 2, 3, 4, 5, 6, 7, 8, 9, 10, 11, 12, 13, or 14, wherein the fuel tank is one of a lower fuselage tank, central tank, a wing tank, and a tail tank.

Clause 16

The fuel tank protection system according to one of clauses 1, 2, 3, 4, 5, 6, 7, 8, 9, 10, 11, 12, 13, 14, or 15, wherein the fuel tank is located in a vehicle that is one of a mobile platform, an aircraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

Clause 17

A fuel tank protection system comprising:
a central fuel tank for an aircraft, wherein the central fuel tank comprises an outer wall, an inner wall, a gap between the inner wall and outer wall, and an intumescent foam located within the gap between the inner wall and the outer wall.

Clause 18

The tank protection system according to clause 17, wherein the intumescent foam located within the gap between the inner wall and the outer wall insulates a passenger area by the central fuel tank from a temperature of a fuel in the central fuel tank.

Clause 19

The tank protection system according to one of clauses 17 or 18, wherein a portion of the intumescent foam undergoes a char formation in response to a heat.

Clause 20

The tank protection system according to clause 19, wherein the char formation results in a char layer that reduces a diffusion of oxygen to impede a flame propagation.

Clause 21

The tank protection system according to one of clauses 1, 2, 3, 4, 5, 6, 7, 8, 9, 10, 11, 12, 13, 14, 15, 16, 17, 18, 19, 02 20, wherein the intumescent material is comprised of at least one of an aromatic polyisocyanate, an aromatic polycarboxylic compound, a furfuryl alcohol, an anhydride, or an isocyanate.

Clause 22

A product management system comprising:
a control system that controls manufacturing equipment to fabricate a fuel tank having an outer wall, an inner wall, a gap between the inner wall and the outer wall, and an intumescent material located within the gap between the inner wall and outer wall.

Thus, illustrative examples provide a method, apparatus, and system for protecting fuel tanks. In one illustrative example, a fuel protection system comprises an outer wall for a fuel tank, an inner wall for the fuel tank; a gap between the inner wall and outer wall, and an intumescent material located within the gap between the outer wall and the inner wall.

With a fuel tank protection system as described in the illustrative examples, protection against undesired inconsistencies can be provided. Further, protection against undesired heating, external or internal can also be provided to a fuel tank. Further, the fuel tank protection system can also increase passenger comfort in passenger areas adjacent to fuel tanks using the fuel tank protection system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fuel tank protection system comprising:
   an outer wall for a fuel tank;
   an inner wall for the fuel tank, the inner wall and the outer wall forming a non-frangible double wall structure for the fuel tank, the double wall structure defining a cavity for holding fuel, the double wall structure surrounding the cavity;
   a gap between the inner wall and the outer wall; and
   an intumescent material located within the gap between the inner wall and the outer wall.

2. The fuel tank protection system of claim 1, wherein a portion of the intumescent material undergoes a char formation in response to a heat.

3. The fuel tank protection system of claim 2, wherein in undergoing the char formation in response to the heat, the portion of the intumescent material undergoes a reaction that forms —C=CH2 fragments at polymer chain ends that condense to form a nonvolatile residue that is richer in carbon than before the reaction.

4. The fuel tank protection system of claim 2, wherein the char formation results in a char layer that reduces a diffusion of oxygen to impede a flame propagation.

5. The fuel tank protection system of claim 1, wherein the intumescent material comprises a coating located on at least one of the outer wall of the fuel tank or the inner wall of the fuel tank.

6. The fuel tank protection system of claim 1, wherein the intumescent material is in a form of a foam.

7. The fuel tank protection system of claim 1, wherein the intumescent material expands to form a thermo-insulating layer within the gap in response to a heat.

8. The fuel tank protection system of claim 7, wherein the intumescent material is in a form of a coating, wherein the coating expands to form a foam in response to the heat.

9. The fuel tank protection system of claim 1, wherein the intumescent material expands into an opening formed in the outer wall of the fuel tank in response to an impact generating the opening and a heat applied to the outer wall of the fuel tank.

10. The fuel tank protection system of claim 9, wherein the intumescent material in the opening chars in response to the heat applied to the outer wall of the fuel tank.

11. The fuel tank protection system of claim 1, wherein a portion of the outer wall is a fuselage of an aircraft.

12. The fuel tank protection system of claim 1, wherein the fuel tank is located adjacent to a passenger area and wherein the inner wall and the intumescent material insulate the passenger area from a temperature within the fuel tank.

13. The fuel tank protection system of claim 1, wherein the inner wall and the outer wall are comprised of a composite material and wherein the inner wall has a first thickness of about 0.25 inches, the outer wall has a second thickness of about 0.25 inches, and the gap has a width of about 0.25 inches.

14. The fuel tank protection system of claim 1, wherein the inner wall and the outer wall are comprised of aluminum and wherein the inner wall has a first thickness of about 0.63 inches, the outer wall has a second thickness of about 0.25 inches, and the gap has a width of about 0.25 inches.

15. The fuel tank protection system of claim 1, wherein the fuel tank is one of a lower fuselage tank, a central tank, a wing tank, and a tail tank.

16. The fuel tank protection system of claim 1, wherein the fuel tank is located in a vehicle that is one of a mobile platform, an aircraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

17. A fuel tank system comprising:
a central fuel tank for an aircraft, wherein the central fuel tank comprises an outer wall, an inner wall, a gap between the inner wall and outer wall, and an intumescent foam located within the gap between the inner wall and the outer wall, and wherein the inner wall and the outer wall form a non-frangible double wall structure defining a cavity for holding fuel, the double wall structure surrounding the cavity.

18. The fuel tank system of claim 17, wherein the intumescent foam located within the gap between the inner wall and the outer wall insulates a passenger area by the central fuel tank from a temperature of a fuel in the central fuel tank.

19. The fuel tank system of claim 17, wherein a portion of the intumescent foam undergoes a char formation in response to a heat.

20. The fuel tank system of claim 19, wherein the char formation results in a char layer that reduces a diffusion of oxygen to impede a flame propagation.

21. The fuel tank system of claim 1, wherein the intumescent material is comprised of at least one of an aromatic polyisocyanate, an aromatic polycarboxylic compound, a furfuryl alcohol, an anhydride, or an isocyanate.

22. A product management system comprising:
a control system that controls manufacturing equipment to fabricate a fuel tank having an outer wall, an inner wall, a gap between the inner wall and the outer wall, and an intumescent material located within the gap between the inner wall and outer wall, and wherein the inner wall and the outer wall form a non-frangible double wall structure defining a cavity for holding fuel, the double wall structure surrounding the cavity.

* * * * *